Feb. 17, 1942. G. J. MANSON 2,273,055
DIE FOR THE MANUFACTURE OF FIBROUS MOLDED PULP ARTICLES
Original Filed Nov. 6, 1930
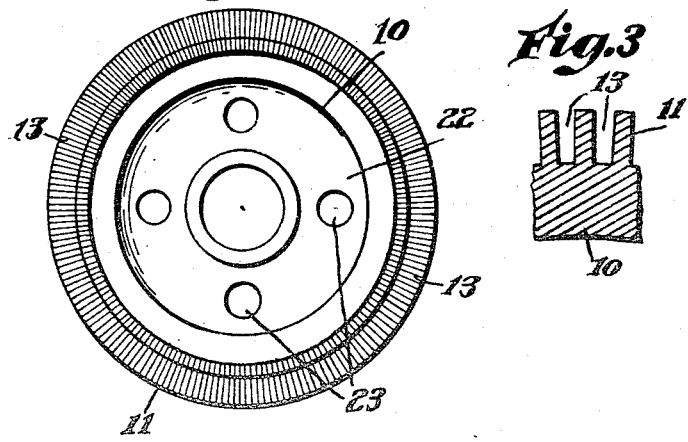
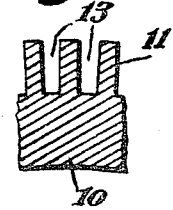
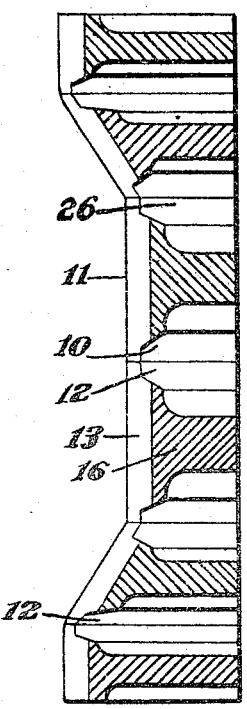
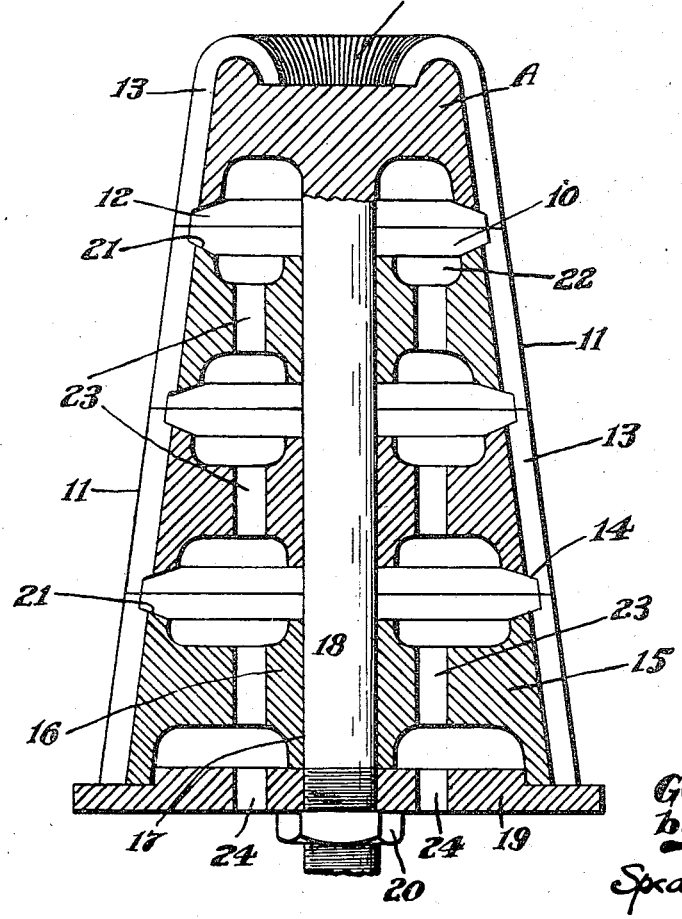
Inventor
George J. Manson
by
Spear, Rawlings & Spear
Attorneys Patented Feb. 17, 1942

2,273,055

UNITED STATES PATENT OFFICE 2,273,055

DIE FOR THE MANUFACTURE OF FIBROUS MOLDED PULP ARTICLES

George J. Manson, Brantford, Ontario, Canada, assignor to Keyes Fibre Company, Portland, Maine, a corporation of Maine Substitute for abandoned application Serial No. 493,831, November 6, 1930. This application February 4, 1938, Serial No. 188,651

2 Claims. (Cl. 92—54)

This invention relates to improvements in molds for forming fibrous articles and process of making the same, and is a substitute for my prior application Serial No. 493,831, filed November 6, 1930.

It has hitherto been the practice to make molded fibrous articles from molds having perforate walls covered with wire mesh or other perforate material, and more recently by means of an assembly of suitably cut plates or so-called "laminated" mold. In the first case it is impossible to produce all types of fibrous articles, due to the fact that the mesh can only be distorted to a limited extent and therefore only certain shapes can be reproduced with any success. Further disadvantages in this type of structure lie in the fact that clear cut molded articles cannot be obtained and due to distortion the life of the mesh or perforate material is very limited.

In the second case, very satisfactory molded products have been obtained. However, the formation of such a mold entails a great deal of labour and expense in addition to the fact that it has been impossible to satisfactorily make all kinds of molded articles through this method unless a two-part mold is employed.

It is an object of the present invention to provide a new mold and process of making the same which will overcome the foregoing disadvantages, and through which practically all types of molded fibrous articles can be formed or dried on a simple mold.

A further object of the invention is to provide a mold structure which may be adapted to a two-part mold if desired.

A further object of the invention is to provide a mold structure having an efficient molding surface on which the pulp stock is directly deposited and retained, the molding surface of said mold providing adequate drainage during the formation of the pulp sheet without the necessity of covering said molding surface with a perforate metal or wire mesh screen or of forming said molding surface of a laminated structure.

A still further object of the invention is to provide a mold structure which may be constructed economically, will produce a molded article of clear-cut design, and in which the molding surface is more resistant to wear by reason of the elimination of the use of a wire mesh covering. Such mold is more economical to maintain in service because it eliminates the cost of the wire mesh, which having a relatively short life, must be frequently replaced. With these and other objects in view, the salient features of the invention will be apparent in the following specification.

According to the present invention the mold material is shaped to the desired article shape and the working face of the mold is provided with a plurality of channels or grooves of such fineness as to form an efficient drainage means for water or water vapors from the working face of the mold and yet retain the fibres of the pulp article directly on said working surface. Each drainage channel or groove connects with one or more drainage passageways and said passageways provide means for exhausting the water or water vapors from the mold.

The steps of producing such a mold are therefore the shaping of mold material, the formation of the drainage passageways therein, and the milling, cutting or otherwise forming of a plurality of relatively narrow surface drainage channels or grooves in the solid working surface of the mold, and such drainage channels or grooves being of the required spacing and depth to give adequate drainage of the water or water vapors from the pulp sheet deposited directly on the solid working surface of the mold and to intersect the drainage passageways to form a complete drainage system for the mold. The working surface of the mold may be one piece or if desired for convenience in assembly and construction may be multipart, which also is a factor in constructing molds of various sizes without necessitating an entirely new mold structure.

The invention will be more readily apparent by reference to the accompanying drawing, in which Fig. 1 is a longitudinal section through the mold according to one form of the present invention.

Fig. 2 is a plan view of one of the sections.

Fig. 3 is an enlarged sectional detail of the surface drainage channels or grooves formed in the working surface of the mold, and Fig. 4 is a fragmentary sectional view of a modified form of the assembly.

Referring more particularly to the drawing, it will be apparent that the sectional type of mold is illustrated, but it is to be understood that this invention is not limited to sectional molds.

The mold as a whole is indicated by the letter A and comprises the interior or non-working surface 10 and exterior or working surface 11. The interior or non-working surface of the mold is circumferentially recessed as at 12 to provide discharge passageways for the water or moisture withdrawn during the molding or drying of the pulp sheet. The exterior or working surface 11 of the mold is milled to provide a plurality of longitudinally extending surface drainage channels or grooves 13 which as indicated at 14 intersect the circumferential recesses 12 and therefore provide direct communication between these recesses and the channels or grooves 13.

The interior of the mold is formed with suitable connecting passageways 23 which through the medium of a suction box or like suction device, finally withdraw the moisture from the pulp sheet and the mold.

In the formation of a sectional mold, the sections 15 are mounted in a suitable manner so as to abut one another and form a continuous mold surface. In the type of mold illustrated in Fig. 1, these sections are formed with an interior spider or web 16 provided with the central passageway 17 through which the mounting spindle 18 may be inserted. The mounting spindle may be formed integral with the upmost or capping section and rigidly retains the mold in mounted position through the medium of a suitable base 19 and securing member such as a nut 20.

As illustrated in Fig. 1 and also in Fig. 4 the circumferential or peripheral recesses 12 are formed at the juncture of two adjacent sections, each section being counter-sunk as at 21 so that when two adjacent sections are joined the complete recess 12 is formed.

Suitable recesses 22 are formed in the web and adjoin the counter-sunk portions of the sections to provide a continuous communication with the drainage passageways 23 which are formed in the web of each section and permit of the passage of moisture down through each section and finally through the drainage outlets 24 at the base of the mold to a suction device, (not shown).

The formation of the upper section in a sectional mold of the character disclosed in Fig. 1 may be as illustrated having the exterior surface drainage channels or grooves 13 terminating in an indentation 25 formed in the top of the mold, thereby producing a suitable end for the product. If desired, however, the end could be finished completely flat through merely re-arranging the channels or grooves in the top such as in radial formation or other desired form.

In the case of the female mold, as illustrated in Fig. 4, or any other type of mold, the principle is entirely the same. The communication with the suction device, however, is varied to meet requirements and in the case of Fig. 4 it is not necessary to provide special passageways between the recesses 12 and the suction device. In this form the drainage recesses 12 in the non-working surface of the mold are in direct communication with the suction device through the medium of the spaces 26 between the webs or supports 16. The drainage therefore takes place through the channels or grooves 13, recesses 12 and through the spaces 26 communicating with the suction device.

The illustration in Fig. 1 is such as to produce a container in the form of a jar, drinking receptacle or the like, whereas the illustration in Fig. 4 is such as would be employed for the production of plates.

Through this general illustration, it will be obvious that the mold structure may be readily varied to suit any requirement, so that the invention has a wide application in the production of fibrous articles.

The surface drainage channels or grooves 13 in the working surface of the mold are of such a character as to approximate the mold formation obtained by a so called "laminated" die and therefore will produce an article of similar character. The size of these channels or grooves, has been greatly exaggerated in Fig. 3 for the sake of clarity and it will be realized that they are actually very small in size so as to produce a smoothly finished, clear cut article.

It is not necessary that the surface drainage channels or grooves of the adjacent mold sections should register with one another to form a continuous channel through the mold, since efficient drainage can be obtained regardless of whether a continuous channel is formed. This is quite evident in view of the fact that the channels or grooves of each section directly communicate with the drainage passageways 12 formed in the non-working surface of the mold. However, if it is found desirable, some suitable means could be employed between each section, such as a projecting lug and corresponding slot or a key way on the spindle so that the channels or grooves in the mold sections would necessarily register with one another and form a continuous channel.

The formation of the surface drainage channels or grooves 13 and the communicating drainage passageways 12 is not necessarily confined to the arrangement disclosed in the drawing, but might be constructed in the form of a plurality of circumferentially extending or laterally extending peripheral surface drainage channels or grooves intersecting with longitudinally extending drainage passageways formed in the non-working surface of the mold. In the case of the mold of Fig. 4, the surface drainage channels or grooves 13 may be radial.

It should also be understood that a mold with this type of drainage surface may be used to hold an article while it is being dried, the escape of the moisture given off by the drying article being through the same means as described for the drainage of the water of formation where the mold is used as a forming die.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A pulp molding die, comprising a plurality of superposed horizontal mold sections assembled in face to face abutment, said mold sections having solid working faces provided with relatively narrow closely spaced vertically extending groove-like channels, a mounting spindle assembled with the uppermost mold section, a clamping plate for said spindle assembled with the lowermost mold section, all of said mold sections except the uppermost section having in their non-working surfaces vertically alined openings for the reception of said mounting spindle whereby the several mold sections may be held in fixed assembly, the abutting faces of adjacent pairs of mold sections each having an annular groove and said grooves intersecting the drainage channels in the working faces of said mold section pairs thereby forming drainage recesses and providing means for the exhaustion of water from said drainage channels and interiorly through the body of the die, and each mold section except the uppermost mold section further having interior openings extending vertically therethrough and connecting said drainage recesses with one another.

2. The die of claim 1, the drainage channels in the uppermost mold section terminating in an indentation formed in the top surface of said section.

GEORGE J. MANSON.